(12) United States Patent
Burrell et al.

(10) Patent No.: US 7,398,151 B1
(45) Date of Patent: Jul. 8, 2008

(54) WEARABLE ELECTRONIC DEVICE

(75) Inventors: Jonathan C. Burrell, Olathe, KS (US); David F. Lammers-Meis, Prairie Village, KS (US)

(73) Assignee: Garmin Ltd. (KY)

( * ) Notice: Subject to any disclaimer, the term of this patent is extended or adjusted under 35 U.S.C. 154(b) by 695 days.

(21) Appl. No.: 10/786,377

(22) Filed: Feb. 25, 2004

(51) Int. Cl.
*G01C 21/00* (2006.01)

(52) U.S. Cl. ............................ 701/200; 701/213; 482/8

(58) Field of Classification Search ................ 701/200, 701/213; 482/8
See application file for complete search history.

(56) References Cited

U.S. PATENT DOCUMENTS

| | | | |
|---|---|---|---|
| 4,408,613 A | 10/1983 | Relyea | 600/483 |
| 5,148,002 A | 9/1992 | Kuo et al. | |
| 5,406,491 A | 4/1995 | Lima | |
| 5,476,427 A | 12/1995 | Fujima | 482/3 |
| 5,552,989 A | 9/1996 | Bertrand | 701/200 |
| 5,583,776 A | 12/1996 | Levi et al. | 364/450 |
| 5,667,459 A | 9/1997 | Su | 482/4 |
| 5,687,136 A | 11/1997 | Borenstein | |
| 5,902,214 A | 5/1999 | Makikawa et al. | 482/4 |
| 5,921,891 A | 7/1999 | Browne | 482/8 |
| 5,942,969 A | 8/1999 | Wicks | 340/286.02 |
| 6,002,982 A | 12/1999 | Fry | 701/213 |
| 6,009,138 A | 12/1999 | Slusky | 377/5 |
| 6,013,007 A | 1/2000 | Root et al. | 482/8 |
| 6,024,655 A | 2/2000 | Coffee | |
| 6,032,108 A | 2/2000 | Seiple et al. | 702/97 |
| 6,050,924 A | 4/2000 | Shea | 482/8 |
| 6,064,942 A | 5/2000 | Johnson et al. | |

(Continued)

FOREIGN PATENT DOCUMENTS

JP 10216361 8/1998

(Continued)

OTHER PUBLICATIONS

U.S. Appl. No. 10/352,543, Lee et al.

(Continued)

*Primary Examiner*—Khoi H. Tran
*Assistant Examiner*—Marie A Weiskopf
(74) *Attorney, Agent, or Firm*—Kevin E. West; Samuel M. Korte

(57) ABSTRACT

A wearable electronic device (10) is disclosed comprising a location determining component (12) enclosed by an elongated housing (14) and a strap (16) operable to secure the housing to a user's forearm for use during exercise or other periods of activity. The housing (14) includes a display (30) and at least one input (44). The display (30) communicates information concerning the device (10) and the input (44) controls the operation of the location determining component (12). In a first preferred embodiment, the location determining component (12) is a GPS receiver operable to determine a geographic location of the device (10). In a second preferred embodiment, the device (110) comprises a location determining component (112) and an exercise performance monitor component (162) operable to compute information relative to the user's exercise. In a third preferred embodiment, the device (212) comprises a location determining component (212) and an entertainment component (264) operable to execute at least one game. In a fourth preferred embodiment, the device (310) comprises a location determining component (312), an exercise performance monitor component (362) and an entertainment component (364).

31 Claims, 7 Drawing Sheets

U.S. PATENT DOCUMENTS

| | | | | |
|---|---|---|---|---|
| 6,066,075 | A | 5/2000 | Poulton | 482/8 |
| 6,067,046 | A | 5/2000 | Nichols | |
| 6,122,960 | A | 9/2000 | Hutchings et al. | 73/493 |
| 6,132,391 | A | 10/2000 | Onari et al. | 600/595 |
| 6,148,262 | A | 11/2000 | Fry | 701/213 |
| 6,152,856 | A | 11/2000 | Studor et al. | 482/8 |
| 6,167,346 | A | 12/2000 | Fukawa | 701/208 |
| 6,182,010 | B1 | 1/2001 | Berstis | |
| 6,244,987 | B1 | 6/2001 | Ohsuga et al. | 482/4 |
| 6,251,048 | B1 | 6/2001 | Kaufman | 482/8 |
| 6,287,200 | B1* | 9/2001 | Sharma | 463/40 |
| 6,305,221 | B1 | 10/2001 | Hutchings | 73/488 |
| 6,320,495 | B1 | 11/2001 | Sporgis | 240/323 |
| 6,336,891 | B1 | 1/2002 | Fedrigon et al. | 482/8 |
| 6,339,746 | B1 | 1/2002 | Sugiyama et al. | 701/209 |
| 6,359,837 | B1 | 3/2002 | Tsukamoto | 368/10 |
| 6,366,855 | B1 | 4/2002 | Reilly et al. | 701/213 |
| 6,374,179 | B1 | 4/2002 | Smith et al. | 701/207 |
| 6,426,719 | B1 | 7/2002 | Nagareda et al. | 342/357.06 |
| 6,428,449 | B1 | 8/2002 | Apseloff | 482/3 |
| 6,446,005 | B1 | 9/2002 | Bingeman et al. | |
| 6,449,583 | B1 | 9/2002 | Sakumoto et al. | 702/179 |
| 6,450,922 | B1 | 9/2002 | Henderson et al. | 482/8 |
| 6,463,385 | B1 | 10/2002 | Fry | 701/213 |
| 6,466,232 | B1 | 10/2002 | Newell et al. | 345/700 |
| 6,498,994 | B2 | 12/2002 | Vock et al. | |
| 6,510,379 | B1 | 1/2003 | Hasegawa et al. | 701/202 |
| 6,513,046 | B1 | 1/2003 | Abbott, III et al. | 707/104.1 |
| 6,513,532 | B2* | 2/2003 | Mault et al. | 600/595 |
| 6,532,432 | B1 | 3/2003 | Nagatsuma et al. | 702/149 |
| 6,539,336 | B1 | 3/2003 | Vock et al. | |
| 6,546,336 | B1 | 4/2003 | Matsuoka et al. | 701/213 |
| 6,549,845 | B2 | 4/2003 | Eakle, Jr. et al. | 701/207 |
| 6,549,915 | B2 | 4/2003 | Abbott, III et al. | 707/104.1 |
| 6,570,532 | B2 | 5/2003 | Mise et al. | 342/357.1 |
| 6,571,200 | B1 | 5/2003 | Mault | 702/182 |
| 6,572,511 | B1 | 6/2003 | Volpe | 482/4 |
| 6,580,664 | B2* | 6/2003 | Magnusson | 368/47 |
| 6,582,342 | B2 | 6/2003 | Kaufman | 482/8 |
| 6,594,617 | B2 | 7/2003 | Scherzinger | |
| 6,621,423 | B1 | 9/2003 | Cooper et al. | 340/995.24 |
| 6,702,719 | B1 | 3/2004 | Brown et al. | 482/8 |
| 6,736,759 | B1* | 5/2004 | Stubbs et al. | 782/8 |
| 6,740,007 | B2 | 5/2004 | Gordon et al. | 482/8 |
| 6,744,403 | B2 | 6/2004 | Milnes et al. | 342/357.07 |
| 6,746,371 | B1 | 6/2004 | Brown et al. | 482/8 |
| 6,837,827 | B1* | 1/2005 | Lee et al. | 482/8 |
| 6,853,955 | B1 | 2/2005 | Burrell | 702/182 |
| 6,863,610 | B2 | 3/2005 | Vancraeynest | 463/41 |
| 6,932,698 | B2 | 8/2005 | Sprogis | 463/9 |
| 6,973,324 | B2 | 12/2005 | Weisshaar et al. | 455/510 |
| 7,038,619 | B2 | 5/2006 | Percy et al. | 342/357.07 |
| 7,027,551 | B2 | 6/2006 | Vogt | 342/357.06 |
| 2002/0006825 | A1 | 1/2002 | Suzuki | 463/40 |
| 2002/0046692 | A1 | 4/2002 | Pharo et al. | 116/200 |
| 2002/0090985 | A1 | 7/2002 | Tochner et al. | 463/1 |
| 2002/0142764 | A1 | 10/2002 | Newell et al. | 455/419 |
| 2003/0036428 | A1 | 2/2003 | Aasland | 463/29 |
| 2003/0134665 | A1 | 7/2003 | Kato et al. | 455/566 |
| 2003/0224855 | A1 | 12/2003 | Cunnigham | 463/41 |
| 2004/0046655 | A1 | 3/2004 | Benes et al. | 340/539.1 |
| 2004/0046692 | A1 | 3/2004 | Robson et al. | 482/8 |

FOREIGN PATENT DOCUMENTS

| | | |
|---|---|---|
| JP | 2001070658 A | 3/2001 |
| JP | 2002273034 | 9/2002 |
| JP | 2002273035 | 9/2002 |
| JP | 2002273054 | 9/2002 |
| WO | WO 01/80499 A2 | 10/2001 |

OTHER PUBLICATIONS

U.S. Appl. No. 10/786,377, Burrell et al.

Thomas, Bruce et al. "First Person Indoor/Outdoor Augmented Reality Application: ARQuake." Personal and Ubiquitous Computing. 2002, 6:75-86.

Piekarski, Wayne et al. "Integrating Virtual and Augmented Realities in an Outdoor Application". 2nd IEEE and ACM International Workshop on Augmented Reality, Oct. 20-21, 1999, San Francisco, California.

Thomas, Bruce et al. "ARQuake: An Outdoor/Indoor Augmented Reality First Person Application." Fourth International Symposium on Wearable Computers, Oct. 18-21, 2000, Atlanta, Georgia.

Piekarski, Wayne and Thomas, Bruce. "ARQuake: The Outdoor Augmented Reality Gaming System." Communications of the ACM, Jan. 2002, vol. 45, No. 1. p. 36-37.

Harris, Craig, "First Impressions: Super Mario Advance." Mar. 22, 2001. http://gameboy.ign.com/articles/092/092645p1.html.

JP 2001070658 A, Machine Translation retrieved on Aug. 5, 2007 from http://dossier1.ipdl.inpit.go.jp/AIPN/aipn_call_transl.ipdl?N0000=7413&N0120=01&N2001=2&N3001=2001-070658&Ntt1—computer_v5&Ntt2=&Ntt3=&N14=&Ntt5=&Ntt6=&Ntt7=&Ntt8=&Ntt9=&Ntt10=.

JP 2001070658 Nakamura, EAST database abstract translation.

* cited by examiner

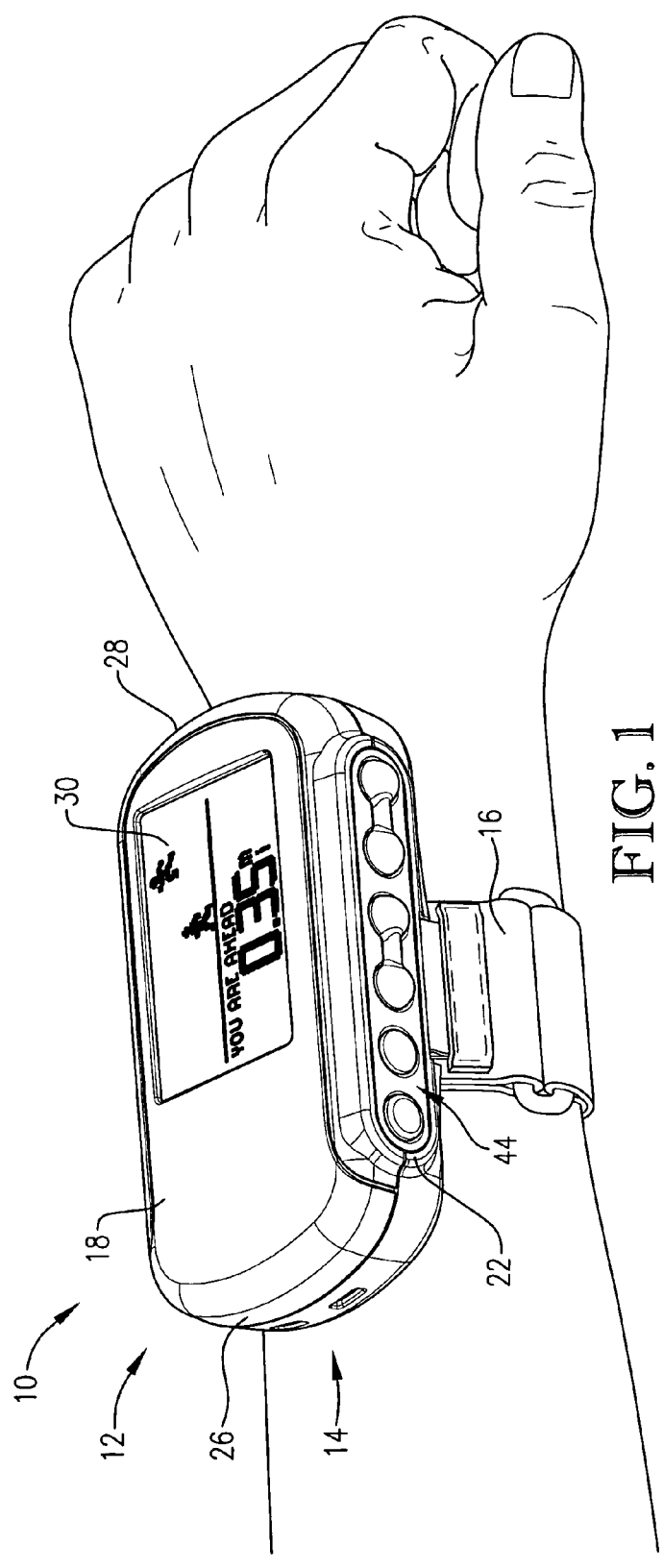
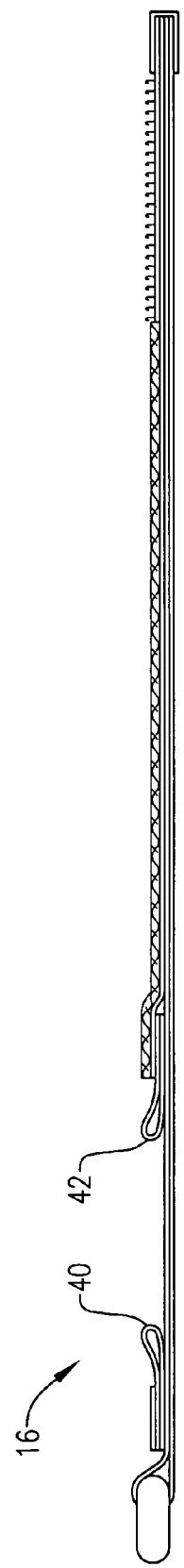

WEARABLE ELECTRONIC DEVICE

BACKGROUND OF THE INVENTION

1. Field of the Invention

The present invention relates to wearable electronic devices. More particularly, the invention relates to wearable electronic devices having a location determining component which may be easily accessed and operated by a user during exercise or other activity.

2. Description of the Prior Art

Portable electronic devices such as mobile telephones, pagers, personal digital assistants ("PDAs"), and global positioning system ("GPS") receiver units are becoming increasingly popular. Because such electronic devices are portable, users often desire to carry them during exercise or other activity in such a manner as to prevent dropping, misplacing, or damaging the electronic device, while at the same time maintaining quick access to the electronic device. Wearable electronic devices have been developed for this purpose.

Prior art wearable electronic devices are often clipped or otherwise secured to the user's clothing, such as the user's belt or a waist of the user's pants. Unfortunately, such attachment methods are cumbersome and do not allow quick access to the devices. Moreover, some securing assemblies are not easily removable from the belt or pants and therefore defeat the portable nature of the devices. Also, when the user sits, the electronic device or securing assembly often pushes into the user's torso. Furthermore, the securing assembly and the electronic device are often obstructed from reach, such as when a safety belt is used in an automobile.

These problems are magnified when the user attempts to engage in physical activity, such as exercise, while carrying an electronic device. Conventional securing assemblies, such as belt clips or pouches, often require the user to be stationary while accessing the electronic device, as the securing assemblies, by their very location, prohibit access of the electronic device during exercise or other periods of rapid movement. Furthermore, prior art wearable electronic devices are often positioned on a user in such a manner that restricts the user's movement, such as when a cumbersome device is positioned on the user's waist or wrist.

Other prior art wearable electronic devices require the user to manipulate a large number of inputs to effectively operate the device. The large number of inputs, and the dexterity required to select the inputs, requires a user who is walking, jogging, running, or otherwise exercising, to cease moving, or use both hands, to operate them. For instance, a user who fails to cease moving may inadvertently power off the device by selecting an incorrect input. Thus, an exercising user is unlikely to take advantage of the functions provided by the prior art wearable electronic devices.

Accordingly, there is a need for a wearable electronic device that overcomes the limitations of the prior art. Specifically, there is a need for a wearable electronic device that offers reliable securement of the device to a user while allowing the user to quickly and easily access the device during exercise or other activity.

Furthermore, there is a need for a wearable electronic device that may be easily worn by a user during exercise or other activity in a manner that does not impede the user's movement.

There is yet a further need for a wearable electronic device that allows the user to easily access multiple functions found in the electronic device without inadvertently powering off the unit or selecting inappropriate functions.

SUMMARY OF THE INVENTION

The present invention solves the above-described problems and provides a distinct advance in the art of wearable electronic devices. More particularly, the present invention provides a wearable electronic device having a location determining component which may be easily accessed and operated by an active user.

The wearable electronic device broadly comprises a location determining component, an elongated housing which encloses the location determining component, and a strap operable to removably secure the housing to a user's forearm, wrist, or other body part. The housing is elongated such that it may easily fit on, and is securely supported by, the user's forearm without interfering with the user's movement, exercise, or activity. The housing is constructed from a suitable lightweight and impact-resistant material such as, for example, plastic, nylon, aluminum, or any combination thereof. The housing preferably includes one or more appropriate gaskets or seals to make it substantially waterproof or resistant. Thus, the housing protects the location determining component against adverse conditions, such as moisture, vibration, and impact, associated with the user's exercise or rapid movement.

The wearable electronic device also preferably includes a display, a plurality of inputs, and a contact all contained in or on the housing. The display communicates information regarding the device and location determining component to the user through the use of shapes, symbols, and fonts of varying sizes. The display may be viewed from multiple angles, thus enabling the user to view the display during exercise. The inputs control the functionality of the device and are positioned on the housing such that they may be easily operated by the user while exercising. The inputs may be spread over multiple surfaces of the housing to minimize accidental use of the inputs. The contact is preferably metal and is operable to interface the device to external devices, such as a power supply or a computer, to power, recharge, or update the device.

The location determining component is adapted to provide geographic location information for the device. The location determining component may be, for example, a global position system (GPS) receiver. The location determining component includes an antenna which is positioned within or on the housing. Preferably, the antenna is entirely enclosed within the housing such that the antenna does not interfere with the user's exercise or activity.

In a second preferred embodiment of the present invention, the wearable electronic device includes both a location determining component, as described above, and an exercise performance monitor component. The exercise performance monitor component is adapted to calculate performance information relative to the user's exercise. The performance information, such as, for example, total distance, total distance goals, speed, speed goals, and location information, may be displayed on the display. The type of performance information calculated and displayed is determined by the user's manipulation of the inputs. The exercise performance monitor component is preferably adapted to receive the user's geographic location information from the location determining component and calculate the performance information based on the geographic location.

In a third preferred embodiment, the wearable electronic device includes both a location determining component, as described above, and an entertainment component. The entertainment component is operable to execute a plurality of games which are stored in the device's memory or otherwise accessible by the entertainment component. The user may manipulate the plurality of inputs to select a particular game and participate in the game, which is displayed on the display. The entertainment component is preferably adapted to receive the user's geographic location information from the location determining component for use in the executed game.

In a fourth preferred embodiment, the wearable electronic device comprises a location determining component, an exercise performance monitor component, and an entertainment component. The exercise performance monitor component and entertainment component are adapted to receive geographic location information from the location determining component. The entertainment component is adapted to receive performance information calculated by the exercise performance monitor component such that the performance information may be used in a game executed by the entertainment component.

By constructing the wearable electronic device as described herein, numerous advantages are realized. First, the wearable electronic device offers reliable securement of the device while allowing the user to quickly and easily access the device during exercise or other periods of activity. Second, the wearable electronic device may be worn on a user's forearm, or wrist, during periods of exercise or activity without discomfort or restricted mobility, as movement of the user's arms, wrists, and hands is not restricted by the device's position. Third, the wearable electronic device is conveniently positioned on the user's forearm, or wrist, to enable the user to easily access multiple functions found in the device without inadvertently powering off the device or selecting inappropriate functions.

These and other important aspects of the present invention are described more fully in the detailed description below.

BRIEF DESCRIPTION OF THE DRAWING FIGURES

A preferred embodiment of the present invention is described in detail below with reference to the attached drawing figures, wherein:

FIG. 1 is a front perspective view of a wearable electronic device constructed in accordance with a preferred embodiment of the present invention as shown being worn on a user's forearm;

FIG. 6 is a side view of a strap of the wearable electronic device;

Figure 2:
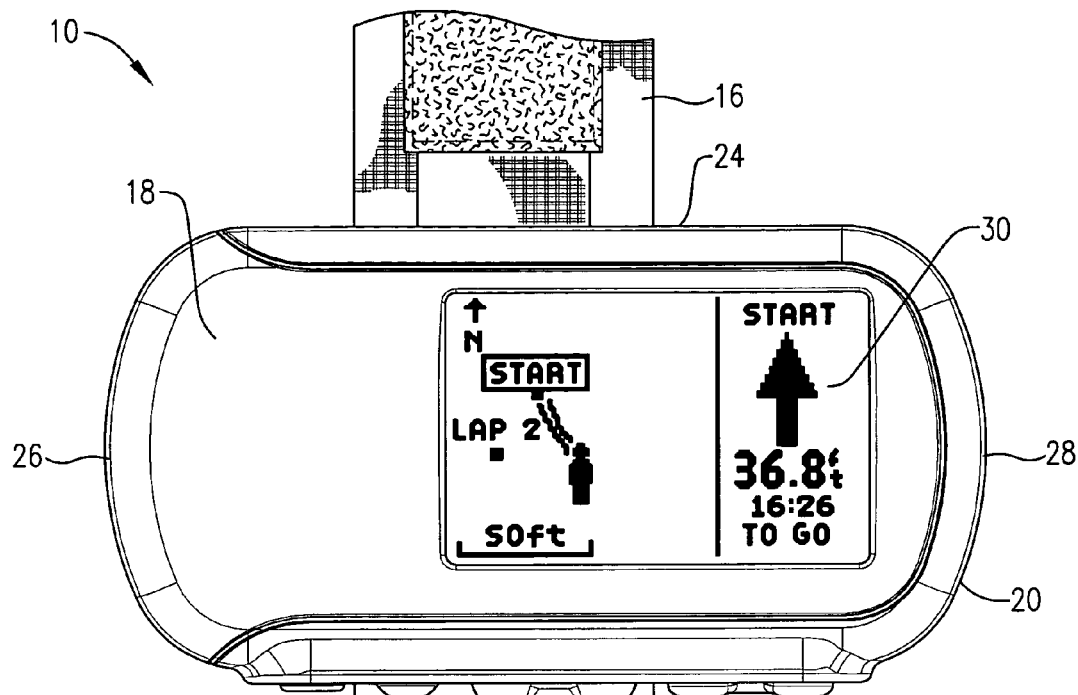
FIG. 2 is a top view of the preferred embodiment of the wearable electronic device.

The drawing figures do not limit the present invention to the specific embodiments disclosed and described herein. The drawings are not necessarily to scale, emphasis instead being placed upon clearly illustrating the principles of the invention.

DETAILED DESCRIPTION OF THE PREFERRED EMBODIMENTS

Turning now to the drawings, and particularly FIGS. 1-7, a wearable electronic device 10 is shown constructed in accordance with a first preferred embodiment of the present invention. The device 10 is configured for easy use and operation by a user while engaging in physical activities that normally prohibit the operation of electronic components. For instance, the device 10 may be operated by a user while exercising, running, jogging, playing, or otherwise moving, on defined or undefined courses and terrain, for land-based activities or water-based activities, or for any combination thereof.

In the illustrated preferred embodiments, the device 10 broadly comprises a location determining component 12, an elongated housing 14 which encloses and protects the location determining component 12 against adverse conditions, such as moisture, vibration, and impact, associated with the exercise or movement of the user, and a strap 16 operable to removably secure the housing 14 to the user's forearm, wrist, or other body part, to facilitate the operation of the location determining component 12 during exercise or other periods of activity.

The housing 14 is preferably constructed from a suitable lightweight and impact-resistant material such as, for example, plastic, nylon, aluminum, or any combination thereof. The housing 14 preferably includes one or more appropriate gaskets or seals to make it substantially waterproof or resistant. The housing 14 may include a location for a battery, or other power source, associated with the device 10. Though shown as being substantially an elongated rectangle, the housing 14 may take any suitable shape or size, including, for example, ergonomic shapes molded to substantially correspond to a portion of the user's forearm whereupon or against which the housing 14 is meant to rest. Preferably, the housing has a width between one and six inches, a height between one-half of an inch and six inches, and a depth between one-sixteenth of an inch and three inches.

The elongated shape of the housing 14 allows the device 10 to be securely supported by the user's forearm or wrist such that the device 10 remains securely attached to the user, even during exercise or other periods of activity. The shape and dimensions of the housing 14 also allow the user to operate the device 10 with one hand, as the housing 14 may be gripped by the user's fingers while inputs described below are operated by the user's thumb. Additionally, the housing 14 has a large surface area to contain components required by the location determining component 12 and a generally flat, rounded, profile to reduce harmful contact of the device 10 to the user or an external element.

Referring to FIGS. 1 and 2, the housing 14 is comprised of a top face 18, a bottom face 20, a front wall 22, a rear wall 24, and a pair of opposed side walls, 26,28. The top face 18 preferably has a width greater than its height and is positioned opposite the bottom face 20. Identifying markings and a display 30 are positioned on the top face 18 such that they may be easily viewed by the user during exercise or other activity. The identifying markings provide instructions to assist the user in identifying the device 10 and operating the location determining component 12.

The display 30 is preferably a liquid crystal display, offset from the center of the top face 18 such that a portion of the top face 18 is not occupied by the display 30, which is capable of displaying multiple lines including a plurality of alphanumeric characters, shapes, and symbols. For instance, the display may use large font and images for easy reference during operation of the device 10, use small font and images to accommodate more information while the user is programming the device 10 or reviewing information, or use a combination of large and small font and images. Additionally, the display 30 is preferably viewable from multiple angles, such that the user may view the display 30 during exercise or activity. The display 30 may also be backlit such that it may be viewed in the dark or other low-light environments. However, the display 30 may be of any type, provided that the display 30 effectively communicates information regarding the device 10 to the user.

Figure 3:
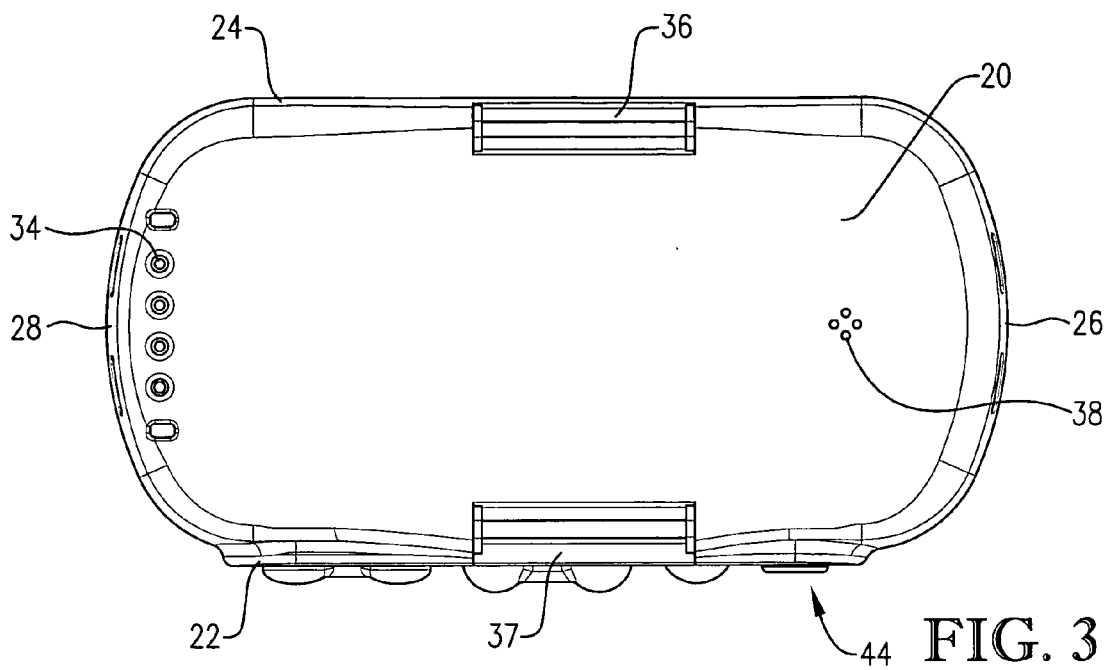
FIG. 3 is a bottom view the housing of the wearable electronic device.

Referring to FIG. 3, the bottom face 20 is positioned opposite the top face 18 and is generally equal in size to the top face 18. At least one contact 24, a pair of connection elements 36,37, and a speaker portion 38 are positioned on the bottom face 20. The contact 34 is preferably metal and is operable to interface the device 10 or location determining component 12 to external devices. For instance, the contact 34 may allow the device 10 or location determining component 12 to be recharged or powered when the device 10 is inserted into a power adapter, such that the contact 34 connects with a reciprocal portion of the power adaptor. Additionally, the contact 34 may allow the device 10 or location determining component 12 to be updated, changed, or to receive data when the device 10 is inserted into a hub, computer, network, or other information device, such that the contact 34 connects with a reciprocal portion of the information device. The contact 34 may be a single contact, or the contact 34 may comprise a plurality of contacts.

Each connection element 36, 37 is operable to attach to a securing element 40, 42. The attachment of the connection elements 36, 37 to the securing elements 40, 42 secures the housing 14 to the securing elements 40, 42 in a manner that prevents the housing 14 from dislodging inadvertently from the securing elements 40, 42 during the rough or inclement use encountered during exercise. Additionally, the connection elements 36, 37 allow the connection to the securing elements 40, 42 to be terminated, such that the housing 14 may be removed from the securing elements 40, 42 by deliberate operation of the user. Alternatively, a single connection element may be used in the place of the pair of connection elements 36, 37 or the housing 14 may be permanently affixed to the strap 16.

The speaker portion 38 allows sound generated by the device 10 to be heard by the user. The speaker portion 38 may comprise a plurality of holes formed in the bottom face 20 or an opening formed in the bottom face 20 that is sufficient in size to fit a speaker. Alternatively, the speaker portion 38 may be comprised of a porous material that is capable of conducting sounds.

Figure 4:
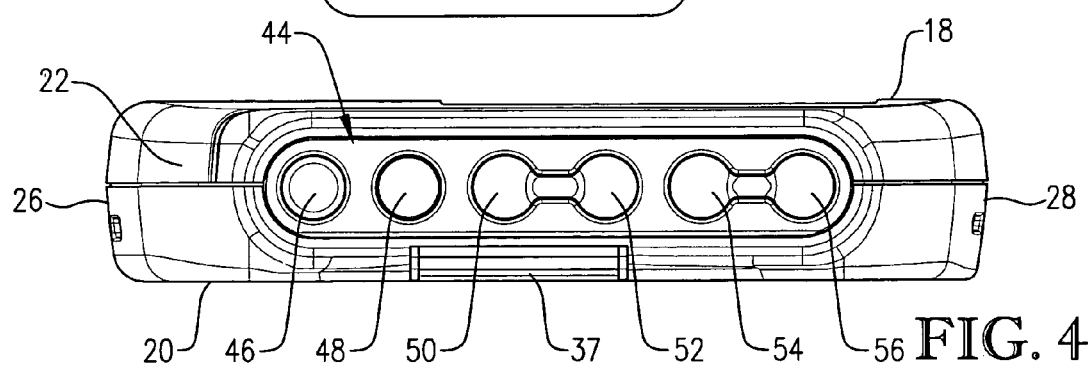
FIG. 4 is a front view of a housing of the wearable electronic device.

Referring to FIG. 4, a front wall 22 is connected to the top face 18 and the bottom face 20. The front wall 22 is generally the same width as the top face 18 and bottom face 20. Preferably, the front wall 22 has a height which is less than its width. A plurality of inputs 44 are positioned on the front wall 22 such that they may be easily accessed by the user during exercise. The inputs 44 may include descriptive markings that identify their function. Preferably, the inputs 44 are positioned on the front wall 22 such that the user may operate the inputs 44 with one hand, thus enabling the user to continue exercising while operating the inputs 44. The inputs 44 control and operate the device 10, location determining component 12, and display 30, such as by operating menus, selecting functions, or inputting information. The inputs 44 may be buttons, switches, keys, an electronic touchscreen associated with the display 30, voice recognition circuitry, or any other elements capable of controlling the device 10 and location determining component 12. Alternatively, the front wall 22 may include a single input instead of the plurality of inputs 44.

Specifically, the inputs 44 may comprise a power input 46 to turn the device 10 or display 30 back-light on and off, a mode input 48 to change the operating mode of the location determining component 12, a reset lap input 50 to reset a timing function, an enter start/stop input 52 to start and stop the timing function or to confirm a menu selection, and a down input 54 and an up input 56 to choose a data screen or change selections within the data screen. Alternatively, the inputs 44 may include any combination of inputs which is required to effectively operate the device 10.

Figure 5:
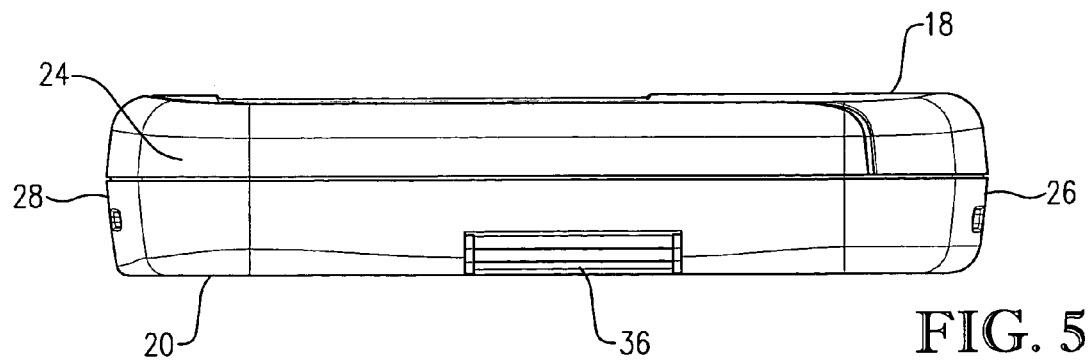
FIG. 5 is a rear view of the housing of the wearable electronic device.

Turning to FIG. 5, the rear wall 24 is connected to the top face 18 and bottom face 20. The rear wall 24 is generally equal in size to the front wall 22 and is positioned opposite the front wall 22. Similarly, the pair of opposed side walls 26, 28 are positioned opposite each other and are each connected to the top face 18 and bottom face 20.

Turning now to FIG. 6, the strap 16 is shown with the pair of securing elements 40, 42. The strap is preferably made of lightweight and resilient fabric, such that the strap may encircle the user's arm without discomfort while still adequately securing the housing 14 to the user's forearm. The strap 16 is removably secured to the housing 14 by the attachment of the securing elements 40, 42 to the connecting elements 36, 37. Preferably, the connection elements 36, 37 are female receiving elements and the securing elements 40,42 are male plug elements that are inserted into the connection elements 36, 37 to secure the strap 16 to the housing 14. However, the connecting elements 36, 37 and securing elements 40, 42 may be any conventional reciprocal connecting and securing pair, such as a hooks, latches, clamps, snaps, buttons, etc. The strap 16 is attached to the user's forearm by encircling the strap around the user's forearm and securing the strap 16 to itself through the use of hooks, latches, clamps, or other conventional fastening elements, thereby securing the housing 14 to the user's forearm. Alternatively, the strap 16 may be configured to attach to other parts of the user, such as the user's leg, waist, wrist, or upper arm.

Referring to FIGS. 1-7, in a first preferred embodiment of the present invention the location determining component 12 is preferably a global positioning system (GPS) having a GPS receiver, and is adapted to provide, in a substantially conventional manner, geographic location information for the device 10 based on signals received from two or more members of an array of orbiting satellites. The location determining component may be, for example, a GPS receiver much like those provided in products by Garmin Corporation and disclosed in U.S. Pat. No. 6,434,485, which is incorporated herein by specific reference.

The location determining component 12 includes an antenna 60, which is positioned within the housing 14 opposite the display 30, to assist the location determining component 12 in receiving signals. The antenna 60 is protected from adverse conditions, such as those described above, by being entirely enclosed within the housing. Additionally, any harmful physical contact that can occur from a user's accidental contact with a conventional, pointed, antenna is eliminated as the antenna 60 has no sharp points protruding from the housing 14. Furthermore, the placement of the antenna 60 adjacent to the display 30 provides the antenna 60 with adequate reception, regardless of the user's physical alignment, as the antenna 60 is always orientated away from the user. Alternatively, the antenna 60 may be operable to broadcast signals and may be positioned elsewhere within the housing 14 or external to the housing 14.

The location determining component 12 is operated by the user through the use of the plurality of inputs 44. For instance, by depressing the mode input 48 a user may enable navigation capabilities of the location determining component 12. The navigation capabilities may allow a user to display the user's current geographic location on the display 30, map the user's location on the display 30, chart a desired course of travel on the display 30, or find a desired location on a map generated on the display 30. Additional navigation capabilities, such as conventional functions found in known navigation units, may also be provided by the location determining component. Supplemental navigational information, such as additional maps or geographical information, may be entered into the location determining component from an external source, such as a computer, through the contact 34, as described above.

Figure 8:
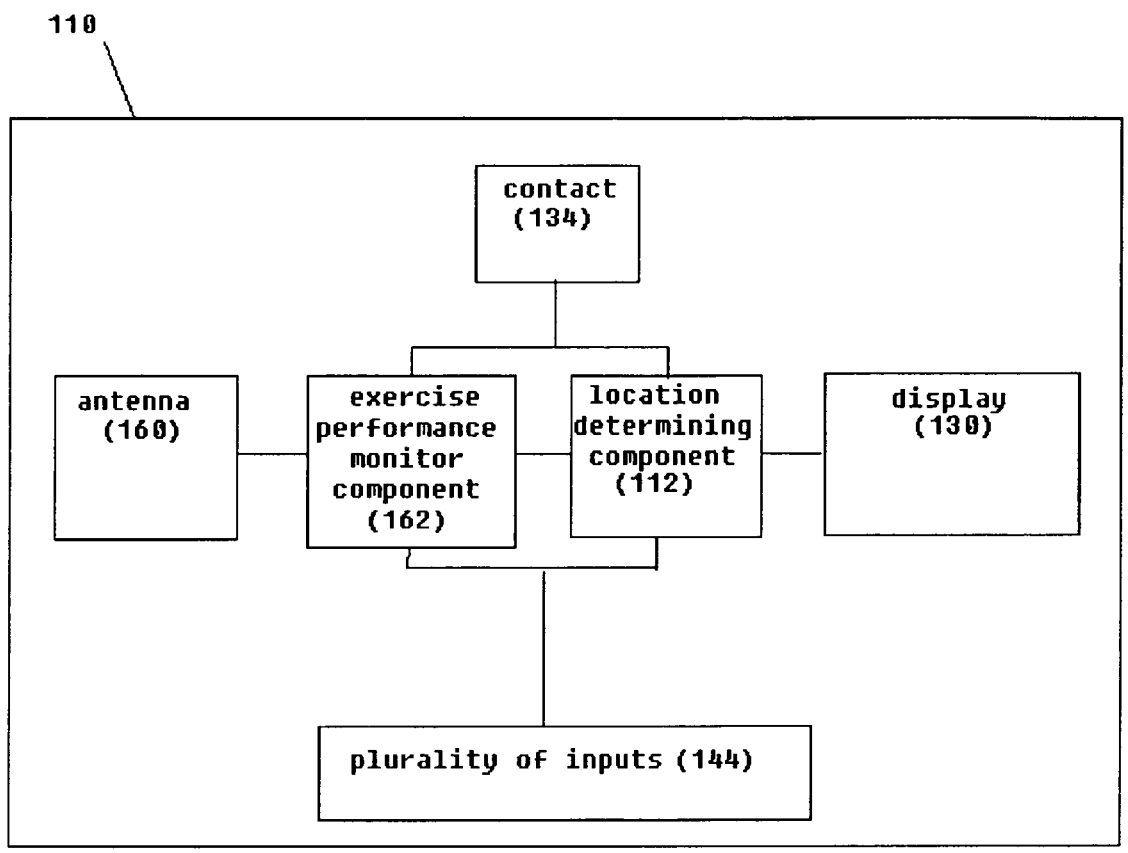
FIG. 8 is a block diagram of a second preferred embodiment of the wearable electronic device.

Turning now to FIG. 8, a second preferred embodiment is substantially the same as the first preferred embodiment and includes a device 110 comprising a location determining component 112, an antenna 160 and an exercise performance monitor component 162. The exercise performance monitor component 162 is adapted to receive the user's geographic location information from the location determining component 112 and calculate performance information relative to the user's exercise. The performance information, such as, for example, total distance, total distance goals, speed, speed goals and location information, may be displayed on a display 130. The type of performance information calculated and displayed is determined by the user's manipulation of a plurality of inputs 144, as described above. Additionally, supplemental exercise performance information may be entered into the exercise performance monitor component 162 from an external source through a contact 134, as described above. Alternatively, the exercise performance monitor component may be the device disclosed in U.S. patent application Ser. No. 10/462,968, entitled APPARATUS USING GPS DERIVED DATA FOR EXERCISE, which is incorporated herein by specific reference.

Figure 9:
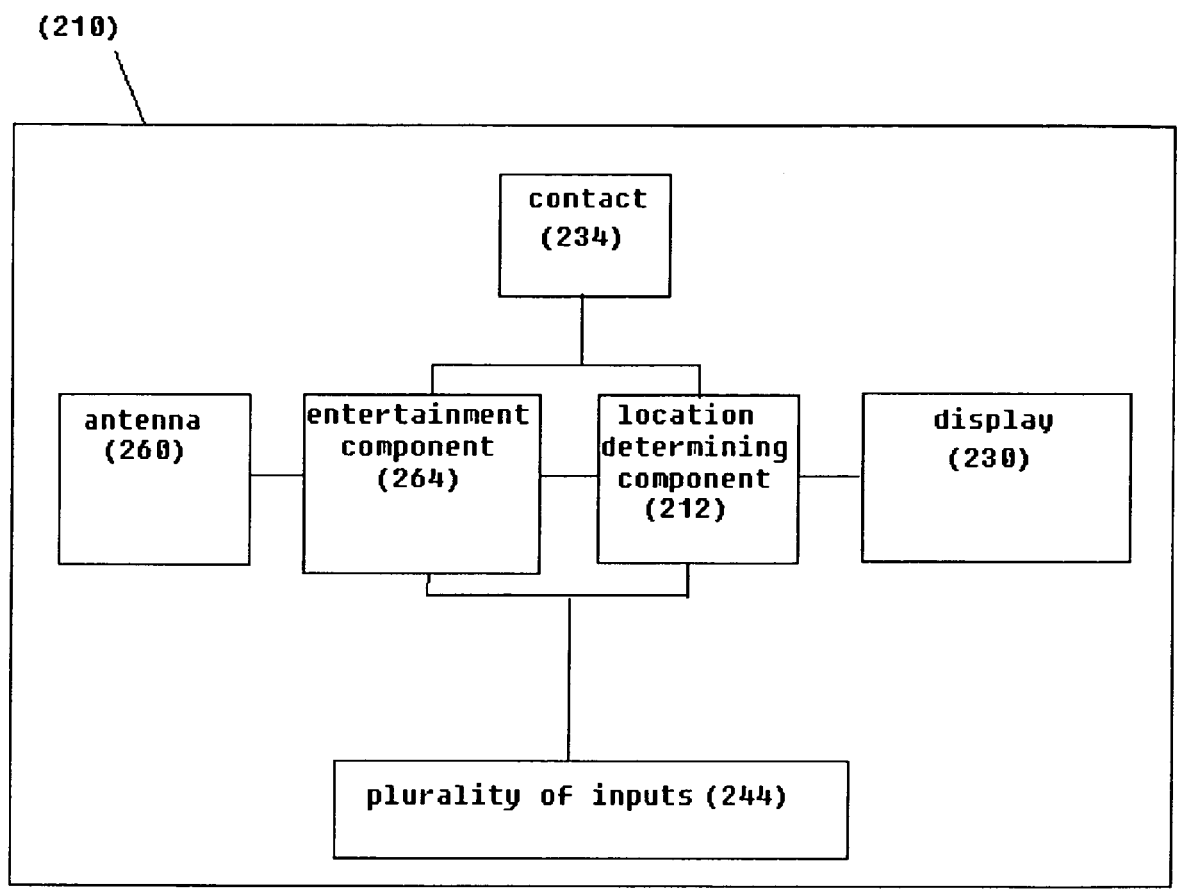
FIG. 9 is a block diagram of a third preferred embodiment of the wearable electronic device.

Turning now to FIG. 9, a third preferred embodiment is substantially the same as the first embodiment and includes a device 210 comprising a location determining component 212, an antenna 260, and an entertainment component 264. The entertainment component 264 is adapted to receive the user's geographic location information from the location determining component 262. Additionally, the entertainment component 264 is operable to execute at least one game that is stored in memory or otherwise accessible by the entertainment component 264. Preferably, the entertainment component 264 is operable to execute a plurality of games. In operation, a user manipulates a plurality of inputs 244 to select a particular game, which is displayed on a display 230, and participate in the game. The entertainment component 264 may connect with other similar entertainment components, by a connection formed through a contact 234, antenna 260, or other connection elements, to allow the user to interact with multiple persons during the course of the game. The game may interface with the user's geographic location information, such as the user's current geographic location, to provide a real-world link in an executed game. Games or additional entertainment information may be entered into the entertainment component 264 from an external source, such as a computer or computer network, through the contact 234, as described above.

Figure 10:
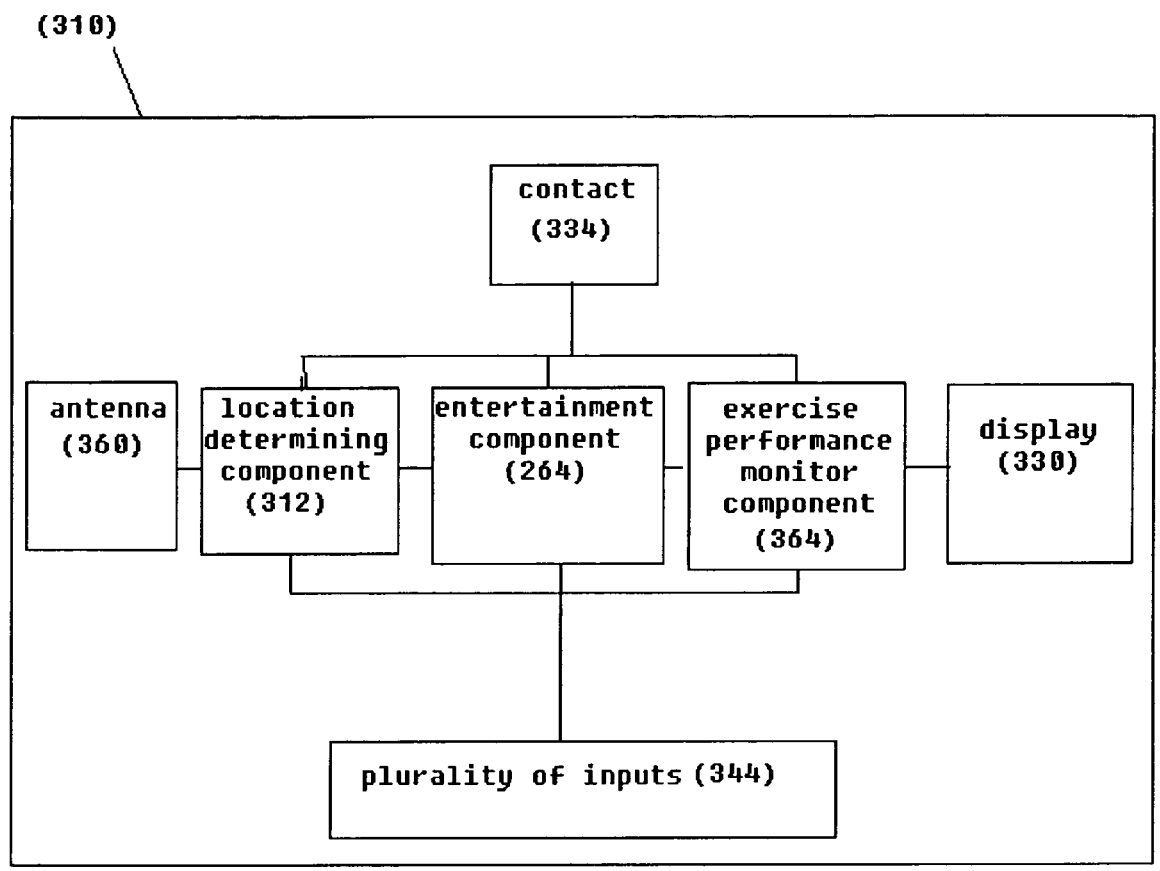
FIG. 10 is a block diagram of a fourth preferred embodiment of the wearable electronic device.

Turning now to FIG. 10, a fourth preferred embodiment is substantially the same as the first, second, and third embodiment and includes a device 310 comprising a location determining component 312, an antenna 360, an exercise performance monitor component 362, and an entertainment component 364. The exercise performance monitor component 362 and the entertainment component 364 are operable to receive geographic location information from the location determining component 312. Additionally, the entertainment component 364 is operable to receive performance information calculated by the exercise performance monitor component 362, such that the entertainment component 362 may use the performance information in an executed game. A display 330 is operable to display information generated by the location determining component 312, exercise performance monitor component 362, and entertainment component 364, as described above. Furthermore, a contact 334 is operable to provide data or other information to the location determining component 312, exercise performance monitor component 362, and entertainment component 364, as described above. Alternatively, the device 310 may include any combination of the location determining component 362, exercise performance monitor component 362, or entertainment component 364.

Figure 11:
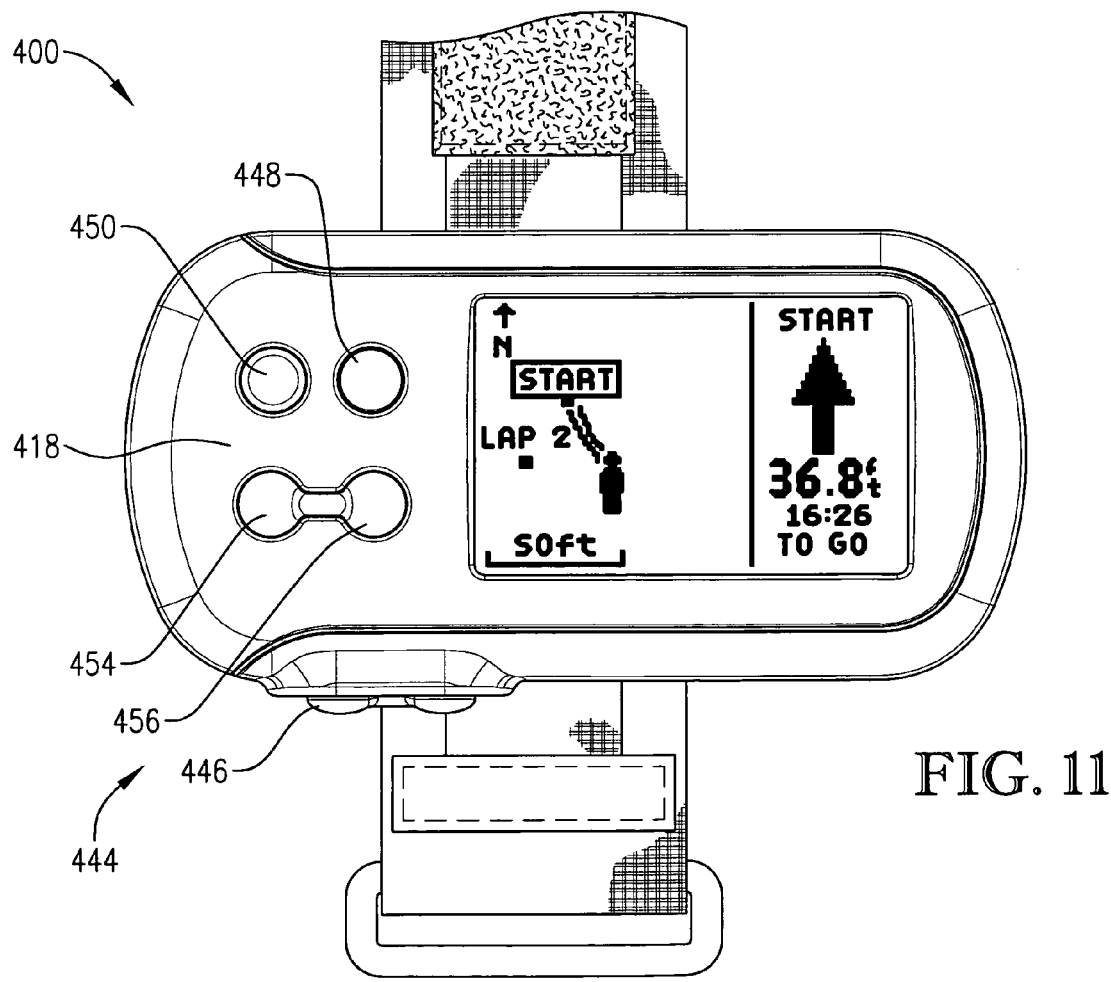
FIG. 11 is a plan view of a fifth preferred embodiment of the wearable electronic device.
Figure 7:
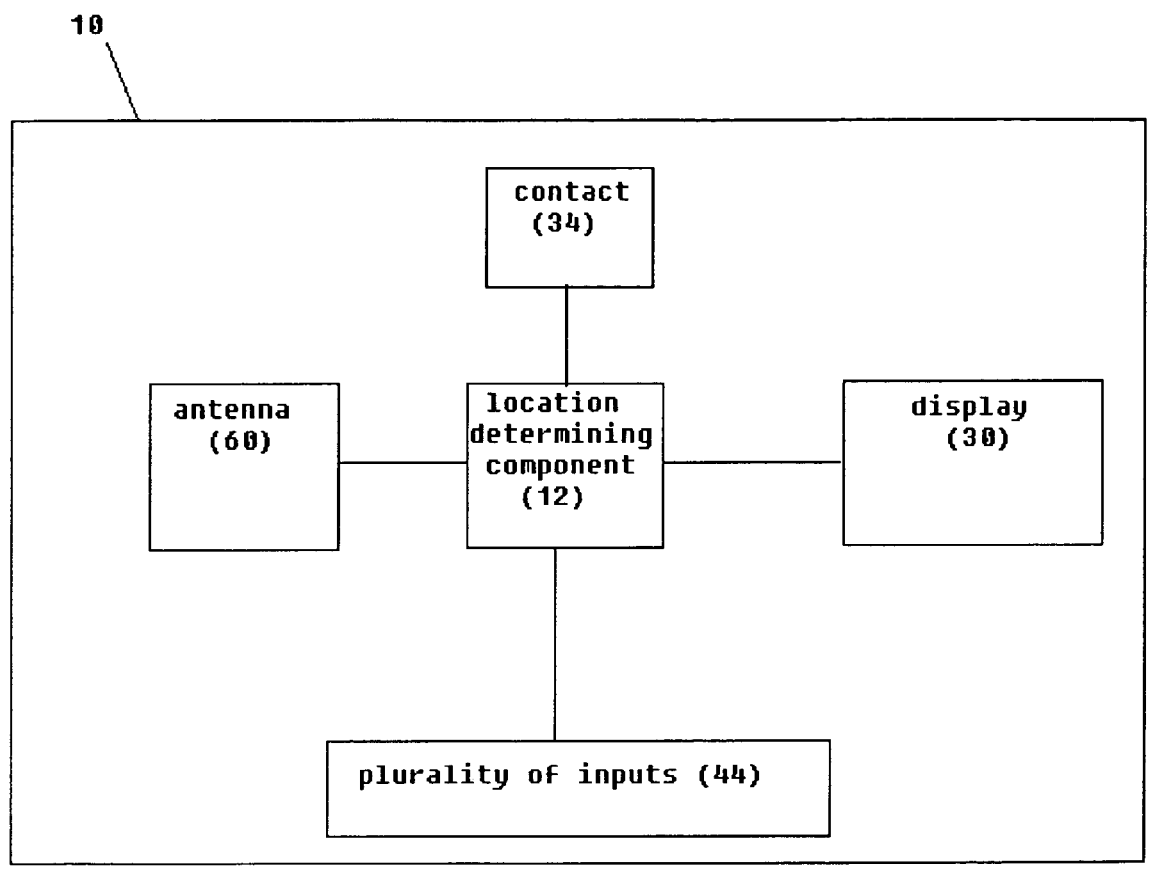
FIG. 7 is a block diagram of a first preferred embodiment of the wearable electronic device.

Turning now to FIG. 11, a fifth preferred embodiment is substantially the same as the first preferred embodiment and includes a device 410 having a plurality of inputs 444 positioned on multiple surfaces of the housing 414, such that at least one of the inputs may be found on a top face 418 and a front wall 422 of the housing 414. For example, the top face 418 may include a mode input 448, a reset lap input 450, an enter start/stop input 452, a down input 454, and a up input 456. The front wall 422 includes other inputs, such as a power input 446. By implementing this configuration, the frequency of accidental device 410 shutdown or power-off is decreased as the power input 446 is separated from the remaining plurality of inputs 444, thereby preventing a user from accidentally selecting the power input 446 while attempting to select another input. Furthermore, this configuration and the position of the device 410 on a user's forearm eliminates the problem of accidental input manipulation caused by the user striking the inputs with parts of his or her body or foreign objects, while exercising, as the forearm is less likely than other parts of the body to accidentally strike foreign objects while exercising. Alternatively, the plurality of inputs 444 may be arranged in any combination, anywhere on the housing, to further increase functionality and decrease inadvertent operation caused by the user's movement during exercise.

Although the invention has been described with reference to the preferred embodiments illustrated in the attached drawing figures, it is noted that equivalents may be employed and substitutions may be made herein without departing from the scope of the invention as recited in the claims.

Having described the preferred embodiments of the present invention, the following is claimed as new and desired to be secured by Letters Patent.

The invention claimed is:

1. A wearable electronic device comprising:
 a location determining component operable to determine geographic location information;
 a housing which encloses the location determining component;
 a display operable to display the geographic location information, wherein the display is positioned on the housing such that it may be easily viewed from multiple angles by a user during exercise;

a plurality of inputs operable to operate the location determining component, wherein the inputs are positioned on the housing such that the inputs may be operated by the user with one hand; and a strap operable to removably attach the housing to the user's forearm, wherein the location determining component is operable to determine the user's current geographic location, map the user's location on the display, chart a desired course of travel on the display, and find a desired location on a map generated on the display.

2. The wearable electronic device of claim 1, wherein the location determining component comprises a GPS receiver.

3. The wearable electronic device of claim 2, wherein the GPS receiver is operable to receive a signal from two or more members of an array of orbiting satellites.

4. The wearable electronic device of claim 1, wherein the device includes an antenna coupled with the location determining component.

5. The wearable electronic device of claim 4, wherein the antenna is enclosed entirely within the housing such that the antenna does not contact the user.

6. The wearable electronic device of claim 4, wherein the antenna is positioned within the housing opposite the display.

7. The wearable electronic device of claim 1, wherein the housing is elongated and shaped to fit on the user's forearm such that the device is securely supported by the user's forearm.

8. The wearable electronic device of claim 7, wherein the housing has a width between two and four inches, a height between one and two inches, and a depth between one-eighth of an inch and one inch.

9. The wearable electronic device of claim 1, wherein the strap is operable to attach the housing to the user's wrist.

10. A wearable electronic device comprising:
    a housing having—
        a top face,
        a bottom face positioned opposite the top face,
        a front wall connected to the top face and the bottom face,
        a rear wall opposed to the front wall, wherein the rear wall is connected to the top face and the bottom face,
        a backlit liquid crystal display positioned on the top face which is operable to display multiple lines of a plurality of alphanumeric characters, shapes, and symbols, capable of being viewed from multiple angles,
        a plurality of contacts positioned on the bottom face operable to receive electrical power and data,
        a pair of connection elements positioned on the bottom face operable to secure the housing, and
        a plurality of inputs positioned on the front wall comprising a power input operable to turn the device on and off, a mode input operable to change an operating mode of the device, a reset lap input operable to reset a timing function, an enter start/stop input operable to start and stop a timing function and to confirm a menu selection, and a down input and an up input operable to choose a data screen and change a selection within the data screen;
    a location determining component based on global positioning system and adapted to determine a geographic location of the device, wherein the location determining component is housed with the housing and interfaced with the plurality of inputs and display, such that the functionality of the location determining component is controlled by the plurality of inputs and the display communicates the geographic location of the device;
    an antenna coupled with the location determining component and enclosed by the housing such that the antenna mat not come into contact with the user; and
    a strap operable to attach to the connection elements and couple with the housing to secure the housing to the user's forearm,
    wherein the location determining component is operable to determine the user's current geographic location, map the user's location on the display, chart a desired course of travel on the display, and find a desired location on a map generated on the display.

11. A wearable electronic device comprising:
    a location determining component operable to determine geographic location information;
    an exercise performance monitor component operable to calculate performance information;
    an housing which encloses the location determining component;
    a display operable to display the geographic location information, wherein the display is positioned on the housing such that it may be easily viewed from multiple angles by a user during exercise;
    a plurality of inputs operable to operate the location determining component, wherein the inputs are positioned on the housing such that the inputs may be operated by the user with one hand; and
    a strap operable to removably attach the housing to the user's forearm,
    wherein the location determining component is operable to determine the user's current geographic location, map the user's location on the display, chart a desired course of travel on the display, and find a desired location on a map generated on the display.

12. The wearable electronic device of claim 11, wherein the location determining component comprises a GPS receiver.

13. The wearable electronic device of claim 12, wherein the GPS receiver is operable to receive a signal from two or more members of an array of orbiting satellites.

14. The wearable electronic device of claim 11, the device including an antenna coupled with the location determining component.

15. The wearable electronic device of claim 14, wherein the antenna is enclosed entirely within the housing such that the antenna does not contact the user.

16. The wearable electronic device of claim 15, wherein the antenna is positioned opposite the display within the housing.

17. The wearable electronic device of claim 11, wherein the housing is elongated and shaped such that it may fit on the user's forearm.

18. The wearable electronic device of claim 11, the housing having a width between two and four inches, a height between one and two inches, and a depth between one-eighth of an inch and one inch.

19. The wearable electronic device of claim 11, wherein the device includes an entertainment component operable to execute at least one game.

20. The wearable electronic device of claim 19, wherein the entertainment component is operable to interface with the location determining component to receive the geographic location from the location determining component.

21. The wearable electronic device of claim 20, wherein the entertainment component includes the geographic location in an executed game.

22. The wearable electronic device of claim 19, wherein the entertainment component is operable to interface with the exercise performance monitor component to receive the performance information.

23. The wearable electronic device of claim 22, wherein the entertainment component includes the geographic location in an executed game.

24. The wearable electronic device of claim 11, wherein the strap is operable to attach the housing to the user's wrist.

25. A wearable electronic device comprising:
- a location determining component having a GPS receiver operable to determine geographic location information including a user's current geographic location;
- an antenna coupled with the location determining component to assist the location determining component in receiving a signal;
- an entertainment component operable to execute at least one game;
- an exercise performance monitor component operable to interface with the location determining component to receive the geographic location information and calculate performance information based on the geographic location information;
- a housing which completely encloses the location determining component, antenna and exercise performance monitor component;
- a display positioned on the housing which is operable to display the geographic location information and performance information, wherein the display may be viewed from multiple angles by the user during exercise;
- a plurality of inputs positioned on the housing such that the inputs may be operated by the user with one hand, wherein the inputs are operable to operate the location determining component and exercise performance monitor component; and
- a strap operable to removably attach the housing to the user's forearm,
- wherein the entertainment component is operable to interface with the exercise performance monitor component to receive the performance information.

26. The wearable electronic device of claim 25, wherein the entertainment component is operable to interface with the location determining component to receive the geographic location from the location determining component.

27. The wearable electronic device of claim 25, wherein the entertainment component includes the geographic location in an executed game.

28. The wearable electronic device of claim 25, wherein the entertainment component includes the performance information in an executed game.

29. The wearable electronic device of claim 25, wherein the housing is elongated and includes a contact operable to receive electrical power and data.

30. The wearable electronic device of claim 29, wherein the location determining component is operable to receive information through the contact.

31. The wearable electronic device of claim 29, wherein the exercise performance monitor component is operable to receive information through the contact.

* * * * *